Aug. 21, 1945. C. E. VOKE 2,383,230
MANUFACTURE OF COLLAPSIBLE TUBES AND THE LIKE
Filed April 16, 1941
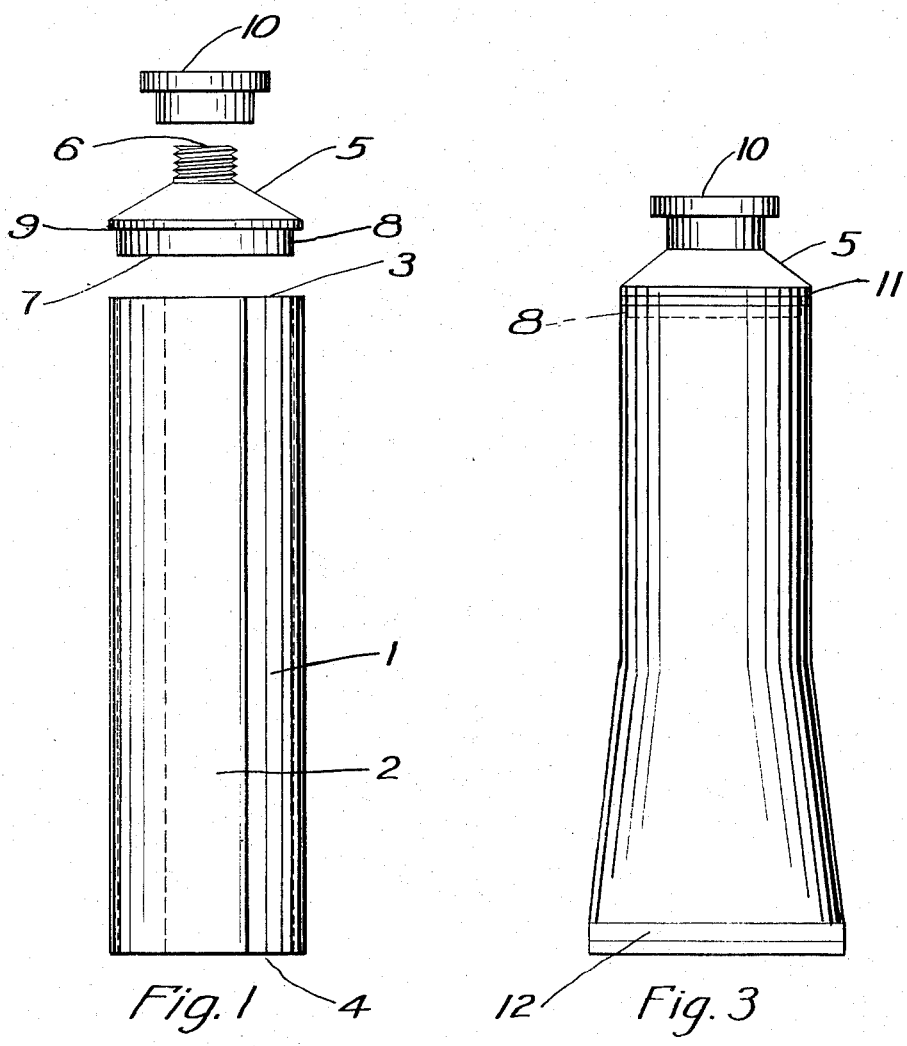
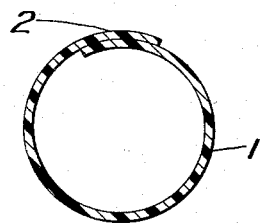

Patented Aug. 21, 1945

2,383,230

UNITED STATES PATENT OFFICE 2,383,230

MANUFACTURE OF COLLAPSIBLE TUBES AND THE LIKE

Carl Edward Voke, Norfolk, Va.

Application April 16, 1941, Serial No. 388,717

1 Claim. (Cl. 154—42)

This invention relates to tube containers. It has to do more particularly with the method for manufacturing non-metallic collapsible tubes and the like, although it is not necessarily limited thereto.

The non-metallic collapsible tubes which have been developed, possess certain disadvantages which have prevented their wide use for the majority of tube products. One of the chief disadvantages has been the lack of a simplified manufacturing method which would make commercially practical tubes. Another disadvantage has been the utilization of structural materials which possess chemical and physical characteristics making them unsuitable for packaging the majority of tube products. Another disadvantage has been the difficulty of effecting proper seals and bonds which will prevent creepage of the packaged product over extended periods of time and during the discharging.

One of the objects of this invention is the provision of a method for manufacturing collapsible tubes of non-cellulosic and/or cellulose derivative materials possessing sufficient thermoplastic properties to form a satisfactory heat-seal to itself with the application of a moderate amount of heat and pressure, in combination with a plastic shoulder member.

Another object is the provision of a method for forming the hollow body member of the tube by using sheet or roll material by over-lapping its vertical edges and heat-sealing to itself with the application of a moderate amount of heat and pressure.

Another object is the provision of a method for closing the base of the tube by pressing its horizontal edges together and then heat-sealing to itself with the application of a moderate amount of heat and pressure.

Another object is the provision of a method for attaching the hollow body member to the plastic shoulder member with the application of adhesive and/or heat and pressure. Other objects will be apparent hereinafter.

In the drawing, Figure 1 shows a cross section view of the hollow body member, the plastic discharge shoulder member and an associated screw cap before assembly. Figure 2 is an end view of the hollow body member showing the overlap of the sheet material where the heat-seal seam is made. Figure 3 is a perspective view of the finished tube showing the heat-seals used in closing the tube base and the surrounding heat-seals used to reinforce the bond of the body and shoulder members.

With reference to the drawing, I represents a pliable hollow body member comprising an open top end 3 and an open lower end 4. The body member I is preferably formed from a blank sheet or roll material by over-lapping its vertical edges. As the blank sheets or roll materials are composed of heat-sealing types of cellulose derivative sheetings and/or coated cellulose derivative sheetings and/or resin sheetings and/or rubber derivative sheeting materials which possess sufficient thermoplastic properties to form a satisfactory heat-seal to itself, the overlap is sealed with the application of a moderate amount of heat and pressure. The seal 2 thus formed gives a vulcanized type of bond, assuring a strong seal without the aid of adhesives or solvents. One of the satisfactory types of rubber derivative sheeting for this application is rubber hydrochloride, the cellulose derivative sheetings include types of ethyl cellulose, and resin sheetings include vinyl polymer. A web of two or more of these types of materials may be laminated for this application for affording the maximum protection for certain tube products.

A hollow end member having a shoulder 5 is provided with a flange 9 extending around the member from its outside periphery and an extending rim 8 formed below said flange. The end member is further provided with a discharge opening 6 at its upper end and an open base 7. The top portion 3 of the body member I is adapted to snugly fit rim 8 in such a manner that its top edge abuts the base of flange 9. Before the fitting is made, a film of a suitable solvent is applied around the rim and/or around the inside periphery of the body member adjacent end 3. The members are fitted and a preliminary bond is then permitted to set. The bond between the body member and rim may be speeded in setting by passing the tube through a heated hood or oven. After the bond has had an opportunity to set, it is further reinforced by the application of a moderate amount of heat and pressure over the bonded area as represented by 11. Tests have indicated this type of bond is particularly strong and prevents creepage of the packaged product over extended periods and remains perfect when normal and severe pressures are applied to the tube. Should it be desired, a viscose band can be placed over this bond. The preliminary bond produced by placing the solvent between the shoulder and body members should be used when the shoulder and body members are composed of dissimilar heat-sealing types of materials. Thus the solvent softens up and causes a slight intermingling between the dissimilar materials of the adjacent surfaces of the shoulder and body members so as to facilitate the subsequent heat-bonding of the materials. When both the shoulder and body members are composed of similar heat-sealing types of materials, the adhesive may be eliminated as only heat and pressure is required to make a satisfactory bond. An associated screw cap 10 is shown for closing the end of the discharge shoulder member.

The base of the tube is adapted to be closed by pressing its edges together and applying a moderate amount of heat and pressure. If desired, the base may be folded and then heat-sealed.

Having thus described the preferred embodiment of the invention, what I claim is:

The method of making collapsible tubes and the like elements which include a tubular body member of one thermoplastic material and an end member of another plastic material, which comprises applying a solvent to said members, fitting the members together, permitting a preliminary bond between said members to set, and subsequently applying heat and pressure to the bonded members in sufficient amounts to thermally bond them integrally together.

CARL EDWARD VOKE.